US010246199B2

(12) United States Patent
Millet et al.

(10) Patent No.: US 10,246,199 B2
(45) Date of Patent: Apr. 2, 2019

(54) LIGHTING DEVICE FOR AIRCRAFT ALLOWING THE INTEGRATION OF ADDITIONAL FUNCTIONS AT ITS CENTER

(71) Applicant: ZODIAC AERO ELECTRIC, Montreuil (FR)

(72) Inventors: Philippe Millet, Chaville (FR); Claude Doule, Paris (FR)

(73) Assignee: Zodiac Aero Electric, Montreuil (FR)

( * ) Notice: Subject to any disclaimer, the term of this patent is extended or adjusted under 35 U.S.C. 154(b) by 36 days.

(21) Appl. No.: 15/167,575

(22) Filed: May 27, 2016

(65) Prior Publication Data

US 2016/0347474 A1 Dec. 1, 2016

(30) Foreign Application Priority Data

May 28, 2015 (FR) ...................................... 15 54797

(51) Int. Cl.
| | |
|---|---|
| *F21V 3/06* | (2018.01) |
| *B64D 47/04* | (2006.01) |
| *F21V 7/00* | (2006.01) |
| *F21V 23/04* | (2006.01) |
| *F21V 29/70* | (2015.01) |
| *F21V 7/06* | (2006.01) |
| *F21V 7/22* | (2018.01) |
| *G08G 5/02* | (2006.01) |
| *F21Y 101/00* | (2016.01) |
| *F21Y 115/10* | (2016.01) |
| *F21Y 107/30* | (2016.01) |

(Continued)

(52) U.S. Cl.
CPC .............. *B64D 47/04* (2013.01); *F21V 3/061* (2018.02); *F21V 7/0008* (2013.01); *F21V 7/0083* (2013.01); *F21V 7/06* (2013.01); *F21V 7/22* (2013.01); *F21V 23/0478* (2013.01); *F21V 29/70* (2015.01); *G08G 5/02* (2013.01); *B64D 47/08* (2013.01); *B64D 2203/00* (2013.01); *F21W 2107/30* (2018.01); *F21Y 2101/00* (2013.01); *F21Y 2107/30* (2016.08); *F21Y 2115/10* (2016.08)

(58) Field of Classification Search
CPC ................................................... F21Y 2107/30
See application file for complete search history.

(56) References Cited

U.S. PATENT DOCUMENTS 3,732,414 A * 5/1973 Franc ...................... F21L 15/06
362/194
4,884,008 A * 11/1989 Bossier ................... F21V 14/04
315/152

(Continued)

FOREIGN PATENT DOCUMENTS

| EP | 2 116 756 A1 | 11/2009 |
|---|---|---|
| EP | 2 574 837 A2 | 4/2013 |
| WO | WO 2013/094480 A1 | 6/2013 |

*Primary Examiner* — Evan P Dzierzynski
(74) *Attorney, Agent, or Firm* — Morgan, Lewis & Bockius LLP

(57) ABSTRACT

A Light Emitting Diode (LED) light for an aircraft includes a hollow cylindrical body, a plurality of LEDs mounted in the hollow body, and at least one reflector to receive light beams emitted by the LEDs and configured to direct the light beams in a lighting direction of the LED light. The LEDs are mounted on a cylindrical support and disposed radially in the cylindrical body, and the cylindrical support has a polygonal contour.

15 Claims, 4 Drawing Sheets

(51) Int. Cl.
*F21W 107/30* (2018.01)
*B64D 47/08* (2006.01)

(56) References Cited

U.S. PATENT DOCUMENTS

| | | | | |
|---|---|---|---|---|
| 6,033,087 | A * | 3/2000 | Shozo | G01N 21/8806 |
| | | | | 362/19 |
| 6,068,384 | A * | 5/2000 | Tyson | F21S 8/022 |
| | | | | 362/153.1 |
| 7,327,254 | B2 * | 2/2008 | Chen | F21V 23/0471 |
| | | | | 340/321 |
| 8,123,379 | B2 * | 2/2012 | Chen | F21V 17/02 |
| | | | | 362/249.05 |
| 2005/0146884 | A1 * | 7/2005 | Scheithauer | B60Q 1/2611 |
| | | | | 362/470 |
| 2006/0001384 | A1 | 1/2006 | Tain et al. | |
| 2010/0277916 | A1 * | 11/2010 | Kira | F21K 9/00 |
| | | | | 362/249.02 |
| 2010/0296285 | A1 * | 11/2010 | Chemel | F21S 2/005 |
| | | | | 362/235 |
| 2013/0249375 | A1 | 9/2013 | Panagotacos et al. | |
| 2014/0199168 | A1 | 7/2014 | Spiro | |
| 2015/0077997 | A1 * | 3/2015 | Sun | F21V 29/83 |
| | | | | 362/249.02 |
| 2015/0153025 | A1 * | 6/2015 | Wu | F21S 8/024 |
| | | | | 362/282 |
| 2015/0167937 | A1 * | 6/2015 | Casper | F21V 23/02 |
| | | | | 362/294 |
| 2015/0230292 | A1 * | 8/2015 | Minamiya | H01Q 1/1278 |
| | | | | 219/203 |

* cited by examiner

LIGHTING DEVICE FOR AIRCRAFT ALLOWING THE INTEGRATION OF ADDITIONAL FUNCTIONS AT ITS CENTER

CROSS-REFERENCE TO RELATED APPLICATION

The present application claims priority under 35 U.S.C. 119(a) to French Patent Application No. 1554797, filed May 28, 2015, which is incorporated herein by reference in its entirety for all purposes.

TECHNICAL FIELD

This disclosure relates generally to Light Emitting Diode (LED) lights for aircrafts, and more specifically to an LED light of the "take-off light" or "landing light" type or to a "taxi light" type of light. This disclosure also relates generally to a LED light for a helicopter intended for use as a search and landing light.

BACKGROUND

Aircrafts generally include several external LED lights each intended for the lighting of an outside area and which are activated as a function of the flight or taxiing phases of the aircraft. The lighting system of an aircraft is thus capable of offering a taxiing function, generally referred to as a "taxi light", a take-off function, generally referred to as a "take-off light", and a landing function, generally referred to as a "landing light".

Take-off and landing lights for an aircraft, generally referred to as "take-off light" and "landing light", as well as search and landing lights for helicopters are extremely powerful in order to be able to have sufficient lighting range, for example of the order of 200 m to 500 m in order to be able to efficiently illuminate the runway, with regard to the take-off and landing lights for aeroplanes, or illuminate the ground, with regard to the search and landing lights for helicopters. They are thus generally capable of providing several hundred thousand candelas of lighting.

As can be understood, for aeronautical applications, the size of the lights, as well as the light intensity that the lights are capable of providing, constitute criteria that must be considered during the design of the lights. The size of the lights is generally denoted by the PAR number, which denotes the diameter of the light in eighths of inches. Thus, the size PAR 36 corresponds to a diameter of 4½ inches, which is 114 mm, PAR 46 corresponds to a diameter of 5¾ inches, which is 145 mm and PAR 64 corresponds to a diameter of 8 inches, which is 203 mm.

Generally, the take-off and landing lights used on passenger transport aeroplanes and on certain helicopters and which are equipped with a halogen source, are of size PAR 64. The recent lighting systems using light emitting diode sources have similar frontal dimensions. They have a diameter of about 200 mm.

Conventionally, LED lights include a reflector exhibiting in cross-section a section of generally parabolic shape, inside of which is mounted an array of light emitting diodes (LEDs) linked to each other and disposed close to the focal axis of the parabola defined by the reflector.

The document WO 03/095894 can be referred to in this respect. In this document, the light emitting diodes are oriented in the direction of lighting. Generally, the diodes may be oriented perpendicular to the direction of lighting, as described in the documents EP 1 731 423, EP 2 450 279 and EP 2 131 104.

The above information disclosed in this Background section is only for enhancement of understanding of the background and therefore it may contain information that does not form the art that is already known in this country to a person of ordinary skill in the art.

SUMMARY

In view of the above, various embodiments of the present disclosure are directed to providing an LED light for an aircraft using light emitting diodes (LEDs) and including a sufficient number of diodes to obtain a sufficient power and therefore sufficient illumination range whilst allowing the integration of a device capable of carrying out an additional function.

In accordance with some embodiments, a light Emitting Diode (LED) light for an aircraft includes a hollow cylindrical body, a plurality of LEDs mounted in the hollow body, and at least one reflector to receive light beams emitted by the LEDs and configured to direct the light beams in a lighting direction of the LED light. The LEDs are mounted on a cylindrical support and disposed radially in the cylindrical body, the cylindrical support having a polygonal contour.

In some embodiments, each side of the cylindrical support having the polygonal contour includes a plurality of LEDs.

In some embodiments, the support is an annular support, and at least one piece of equipment to execute an auxiliary function is mounted at a center of the annular support.

In some embodiments, the piece of equipment is selected from the group consisting of a camera, a radar, and a sensor.

In some embodiments, the piece of equipment is covered by a glass that is transparent to light.

In some embodiments, the glass is a de-icer.

In some embodiments, the support includes a front face including a radiator for dissipating thermal energy, and the radiator is annular or disk shaped.

In some embodiments, the diodes are mounted on at least one printed circuit board fixed on the support.

In some embodiments, the LED light further includes an electronic card for powering the diodes mounted in the body.

In some embodiments, the LED light further includes an annular glass sealably covering the diodes and the reflector.

In some embodiments, the body includes a rear face including a radiator for dissipation of thermal energy.

In some embodiments, the LED light further includes a set of juxtaposed reflector elements of revolution having a typically parabolic generatrix.

In some embodiments, each diode is associated with a reflecting element.

In some embodiments, the LED light further includes reflector elements inclinedly mounted with respect to the lighting direction of the LED light.

In some embodiments, the reflector elements are made of injection molded plastic covered with a layer of light-reflecting aluminum.

The methods and apparatuses of the various embodiments of this disclosure have other features and advantages which will be apparent from or are set forth in more detail in the accompanying drawings, which are incorporated herein, and the following Detailed Description, which together serve to explain certain principles of the various embodiments.

BRIEF DESCRIPTION OF THE DRAWINGS

For a better understanding of the various described embodiments, reference should be made to the Detailed Description below, in conjunction with the following drawings. Like reference numerals refer to corresponding parts throughout the figures and description.

It should be understood that the appended drawings are not necessarily to scale, presenting a somewhat simplified representation of various features illustrative of the basic principles of the various embodiments of this disclosure. The specific design features of the various embodiments, as disclosed herein, including, for example, specific dimensions, orientations, locations, and shapes will be determined in part by the particular intended application and use environment.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first pair could be termed a second pair, and, similarly, a second pair could be termed a first pair, without departing from the scope of the various described embodiments. The first pair and the second pair are both pairs, but they are not the same pair.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
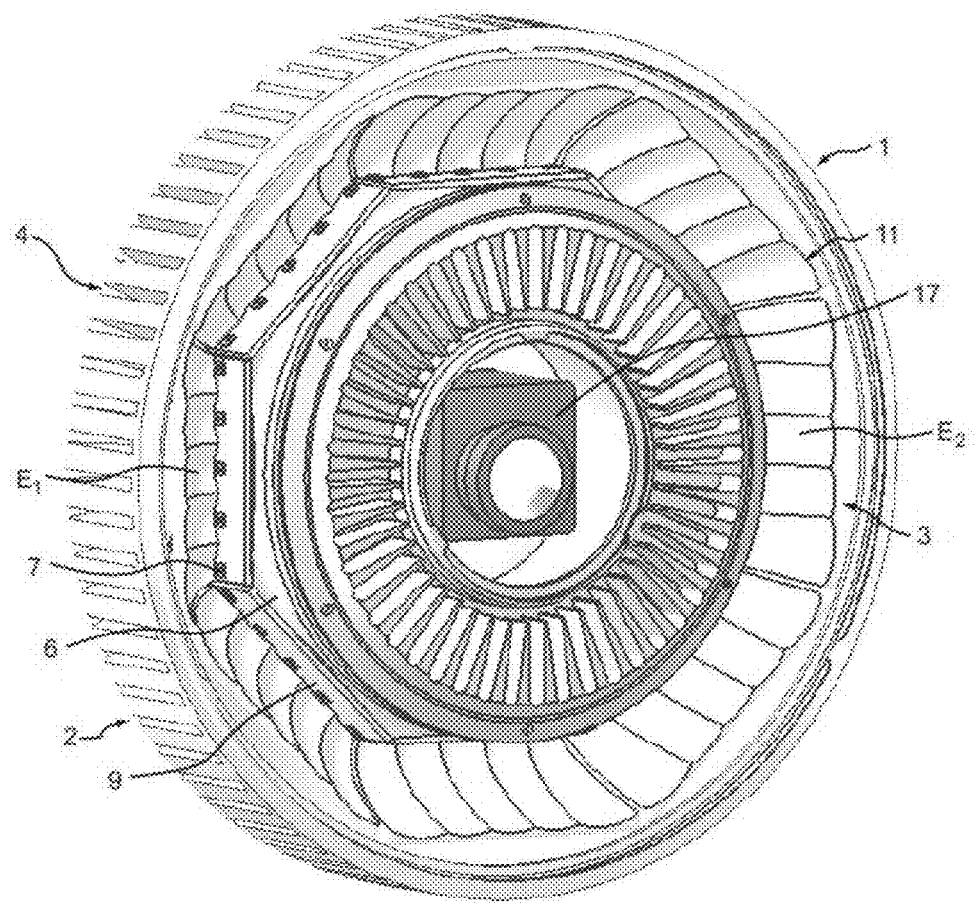
FIG. 1 illustrates a perspective view of a LED light for an aircraft in accordance with some embodiments.
Figure 2:
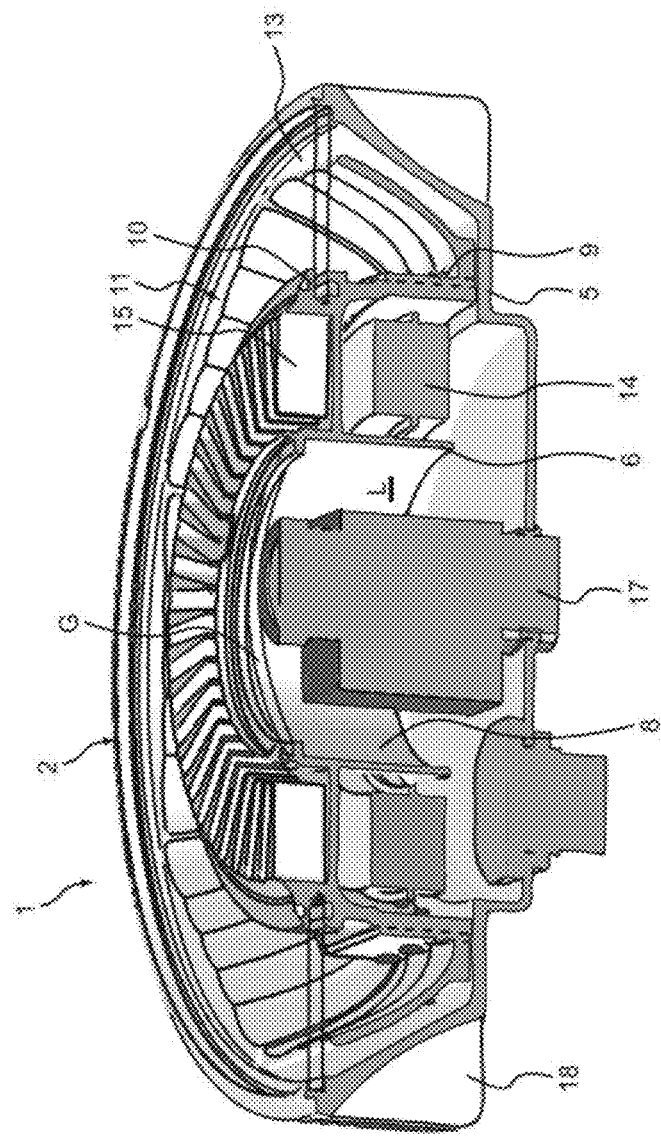
FIG. 2 illustrates a cross-sectional view of the LED light shown in FIG. 1.

FIGS. 1 and 2 illustrate a light emitting diode (LED) light 1 for an aircraft in accordance with some embodiments. Such an LED light is intended as a landing light or a take-off light. The LED light may also be used as a search and landing light for helicopters.

In some embodiments, the LED light 1 is a light having the "PAR 64" format. The scope of the various embodiments is however not limited thereto. Thus, other variants, notably in terms of number of diodes 7, of reflector elements E1, E2, of diameters of lights, of characteristics of the emitted beam or of arrangement or shape of the body 2, are also feasible.

In some embodiments, the LED light 1 includes a body 2 including a front face 3, facing a direction of emission of light, and an opposite rear face 4. The body 2 has a hollow cylindrical shape closed by a back 5 on the rear face 4 side and here having a diameter of 203 mm. The cylindrical body internally includes a support 6 upon which are mounted a set of diodes 7. The support may have various shapes in various embodiments. In the embodiment shown in FIGS. 1 and 2, the cylindrical support 6 has a polygonal base and has an overall annular shape.

The annular cylindrical support 6 includes a cylindrical internal wall 8, a polygonal external face 9, upon which the diodes 7 are mounted, extending forward, by a cylindrical end rim 10. The polygonal contour of the support 6, octagonal in this case, provides the area for mounting the diodes 7. Each side of the polygonal support includes five diodes mounted on a printed circuit board, which is a printed circuit board with an insulated metal substrate (or IMS) specifically adapted to receive power diodes. In of the illustrated embodiments, each side of the polygonal support 6 receives five diodes 7 so that the LED light 1 includes 40 diodes 7 regularly distributed around the polygonal support.

Moreover, between the external peripheral wall of the support 6 and the body 3, the LED light 1 includes 8 reflectors 11 including several juxtaposed assemblies of reflector elements (e.g., E1, E2) each being positioned on one of the polygonal sides of the support 6. The reflector elements include portions of mirror of revolution, typically parabolic, and are each disposed facing an LED, i.e., diode 7.

In some embodiments, an annular glass 13, transparent to light, is fixed on the body 3 and in a groove formed in the cylindrical edge 10 of the support, in the path of the light beams emitted by the diodes 7 and reflected by the reflector elements E1 and E2. The light emitting diodes are powered by an electronic power supply card 14, annular in this case, fixed on the support 6 which is housed between the external face of the internal cylindrical wall 8 and the internal face of the polygonal wall of the support 6.

As can be understood, the mounting of the diodes in the cylindrical body in a radial manner on a support with a polygonal contour and the use of an annular glass make it possible to free a housing L in the center of the LED light.

Moreover, the polygonal support may include a closed front face 15 shaped in such a way as to form a radiator capable of evacuating the thermal energy released by the diodes and by the electronic power supply card during the functioning of the LED light 1. The positioning of a radiator at the front face 15 is in fact advantageous insofar as this face is often exposed to outside elements and is therefore well cooled.

In some embodiments, in the housing L, the LED light 1 includes one or more additional or auxiliary pieces of equipment 17 capable of carrying out supplementary functions. The equipment 17 may be a sensor, a radar or a camera. In these embodiments, the electronic power supply card 14 may be provided, notably programmed, for also ensuring the control of such an additional item of equipment.

As illustrated in FIG. 2, the equipment 17 is covered by a glass G that is transparent to light or, in a general manner, to radiation, notably electromagnetic radiation, emitted and/or or detected by the equipment 17 or by the equipment installed in the housing L. Advantageously, the glass G may be provided with de-icing means, e.g., a de-icer, which is of a conventional type. The presence of the equipment 17 is optional. In the absence of the equipment, the electronic card 14 may be cylindrical and the front face 15 forming the radiator may be disk-shaped.

The support upon which the IMS printed circuit boards are mounted is fixed on the body 2. Moreover, the radiator provided on the front face 15 of the polygonal support is integrally formed with the latter. Efficient thermal coupling is thus obtained between the diodes 7, the additional equipment 17 and the radiator.

The reflector elements E1, E2 are not involved in the evacuation of the heat released by the diodes 7 so they may be made from metal plated injection molded plastic, for example, injection molded plastic covered with a layer of light-reflecting aluminum.

However, as shown in FIGS. 1 and 2, it is also possible to provide, on the rear face 4, a second radiator 18 formed in the body 2.

In some embodiments, light modules provided on each face of the polygonal support 6 are identical. As mentioned previously, five diodes 7 will for example be provided for each module provided on one of the faces of the polygonal support 6. They can for example be diodes capable of delivering a light intensity of 270 lumens when they are powered with 1000 mA.

With regard to the reflector 11, for an LED light 1 including a polygonal support 6 with a side dimension of 130 mm, the reflector 11 also exhibits an overall polygonal shape here comprising eight identical modules each corresponding to an LED lighting module. Each reflector module comprises five reflector elements, parabolic in this case, having a focus of 4 mm, a height of 21 mm and a depth of 26.5 mm. The diodes 7 will be positioned such that they are at the focal point of a reflector 11.

It has been observed that such a LED light is capable of delivering a peak intensity of the order of 730,000 candelas and a circular field of +/−4.65° at 73,000 candelas, that is, 10% of the peak intensity. The luminous flux in the useful field is 5740 lumens for 10,800 lumens emitted, that is an optical efficiently of 53% considering a reflector having a coefficient of reflection of 85%. The light emitting diodes have a power of 3 watts and an emitting area of 1 mm². Landing or take-off lights generally produce an oval beam having a typical angular divergence of 12°×8° (+/−6°×+/−40) considered at 10% of maximum intensity.

As shown in FIG. 1, provision can be made for two diametrically opposed reflector elements E1 and E2 extending along a horizontal line to be mounted in an inclined manner with respect to the lighting direction of the LED light 1 and angled by several degrees, for example by 3° towards the outside so that the axis of these reflector elements diverges. Because of this feature, the LED light 1 presents a circular elliptical field of 11.2°×9° (plus or minus 5.6°×plus or minus 4.50) at 62,000 candelas, that is 10% of the peak intensity, here at 620,000 candelas. The luminous flux in the useful field is 5640 lumens for 10,800 lumens emitted, that is an optical efficiency of 52% considering a reflector having a coefficient of reflection of 85%.

Figure 3:
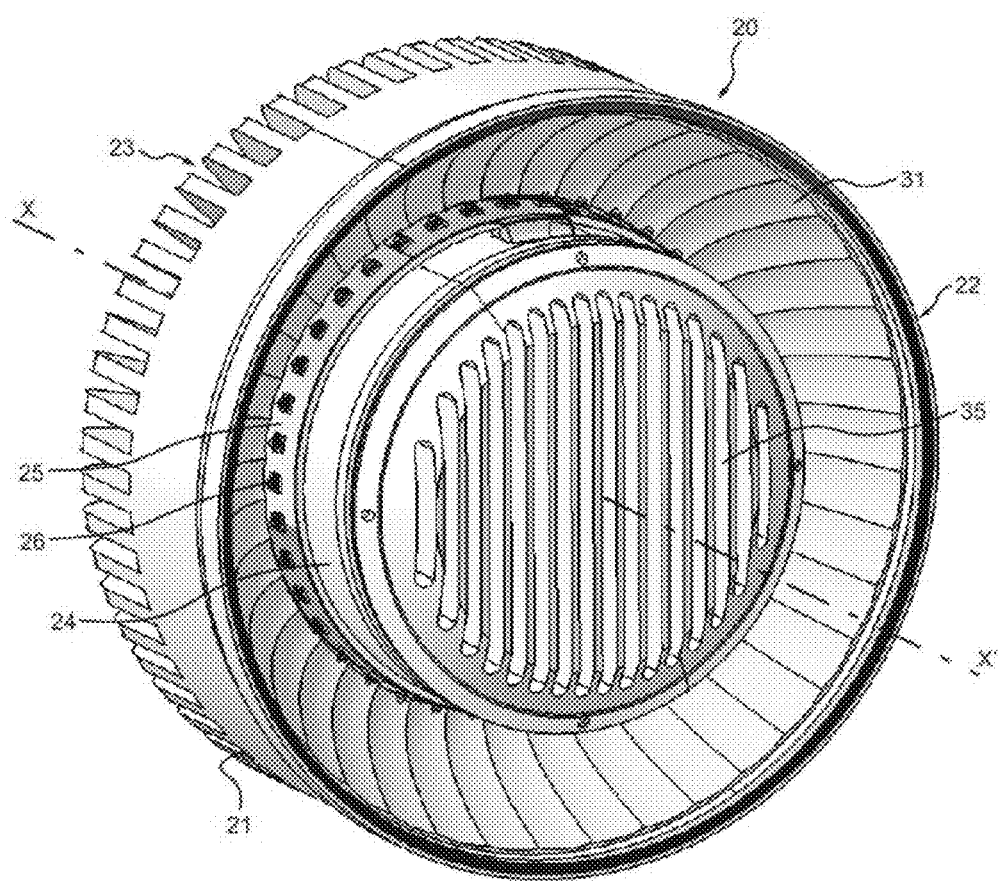
FIG. 3 illustrates a perspective view of a light for an aircraft in accordance with some embodiments.
Figure 4:
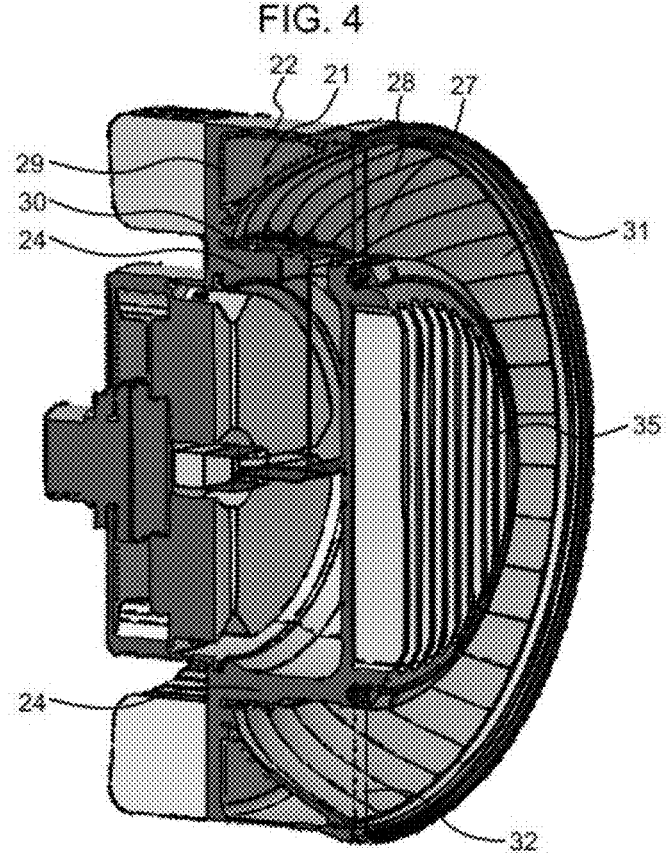
FIG. 4 and FIG. 5 are cross-sectional views, through two perpendicular planes, of the light illustrated in FIG. 3.
Figure 5:
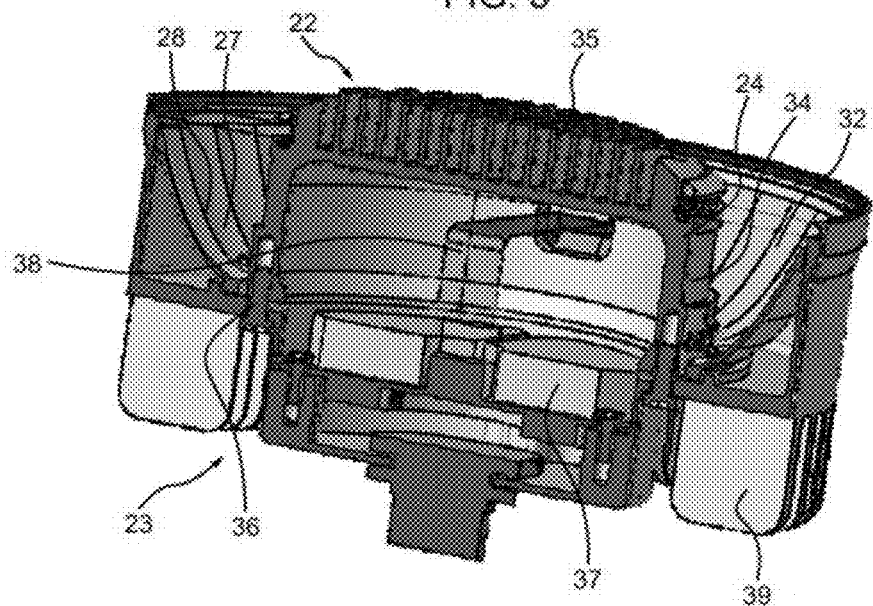

FIGS. 3-5 illustrate views of a light for an aircraft in accordance with some embodiments. In these embodiments, an LED light 20 includes a cylindrical body 21, having an axis X-X' and an external diameter of 145 mm, such that the light here is of size PAR 46. The LED light 20 includes a front face 22, through which the light beam is delivered by the light and an opposite rear face 23. The body 21 includes an annular support 24 produced in the form of a hollow cylinder around which is wound a printed circuit board 25 including a set of light emitting diodes 26 disposed radially, that is, perpendicular to the axis X-X' of the body 21. For example, the printed circuit 25 may include 40 light emitting diodes 26 regularly distributed around the support 24.

In some embodiments, the printed circuit board 25 is flexible. In other embodiments, it may be non-flexible, being shaped in such a way as to be adapted to the diameter of the annular support 24.

As shown in FIG. 4, at the level of the front face 22, the body 21 includes a housing 27 internally delimited by the support 24 and externally delimited by a peripheral wall 28 and by a back 29. As can be seen, the back 29 includes, in the vicinity of the support 24, a groove 30 into which is fitted a set of juxtaposed parabolic reflector elements, such as 31, disposed as a ring and each one placed facing a diode 26 such that each diode 26 is placed at the focus of a reflector element 31. The juxtaposed reflector elements 31 jointly form a reflector which receives the radiation emitted by the light emitting diodes 26 in order to direct them along the lighting direction, that is, parallel to the axis X-X'.

As can be seen in FIGS. 3 and 4, an annular glass 32 which is transparent to light is placed in the path of the beam reflected by the reflector 31.

It is observed that the mounting of the light emitting diodes on an annular support 24, the mounting of the reflector elements 31 in a ring and the use of an annular glass 32 make it possible to leave a free space in the center of the body inside of which is placed the annular support 24, which comprises a globally cylindrical wall 34 and a transverse end wall 35 which constitutes a radiator facilitating the dissipation of the heat generated by the LEDs 26.

The annular support 24 is fixed to the body by screws, such as 36. It forms a bell under which is placed an electronic card 37 for powering the diodes 26 and which is itself connected to a layer of conductors 38, such that this power supply card 37 is also connected for heat exchange with the radiator 35. The body 21 is also provided, on its rear face 23, with a second radiator 39 which also contributes to the dissipation of the heat generated by the LEDs 26.

However, the presence of the radiator 35 on the front face 22 of the light is advantageous insofar as this face is generally exposed to the outside elements and is therefore efficiently cooled. Moreover, the ring arrangement of the reflector elements and of the diodes makes it possible to densify the diodes and thus to create a light of very high intensity and to do so with small overall dimensions. It has notably been observed that such a light having a PAR 46 format makes it possible to obtain an intensity of the order of 450,000 to 600,000 candelas.

In some embodiments, the LED light 20 described with reference to FIGS. 3 to 5 includes a reflector formed of 40 sectors of parabolic mirrors of revolution with a focus equal to 4 mm. The axes of the 40 mirrors are at 47 mm from the principal axis of the light. Each sector of mirror covers an angle of 9°. The LED light 20 includes 40 light emitting diodes each disposed at the focus of one of the 40 sectors of mirror. The reflector composed of the 40 sectors of mirror has a diameter of 136 mm, that is to say a radius of 21 mm for each of the parabolas of revolution. Such an LED light 20 makes it possible to obtain a peak intensity of 600,000 candelas and a circular field of +/−50 at 60,000 candelas. The luminous flux in the useful field is 5200 lumens for 10800 lumens emitted, that is to say an optical efficiency of 48% considering a reflector having a coefficient of reflection of 90%.

Moreover, the reduction of the frontal diameter of the light obtained because of the particular disposition of the diodes and of the reflector elements makes it possible, in the case of use of a light in a lighting system for aircraft, to house these lights in the leading edge of the wings whilst having a transparent window of limited size.

The reduction in the size of the LED light also facilitates the mounting of an LED light having the PAR 46 format on board a helicopter in order to form a search light, whilst having performance similar to that of a light having the PAR 64 format.

Moreover, when the body 21 is a sufficient size such that the dissipation produced at the rear by the second radiator 39 is sufficient, the first radiator 35 provided on the front face on the annular support 24 may be omitted. As in the embodiment shown in FIGS. 1 and 2, the space freed at the center of the casing may then be used for installing one or more other devices in it for carrying out an additional function, for example, other lighting functions.

The space freed at the center of the casing may also be used for installing various types of sensors at the center of the annular support, or even a camera or a radar in such a way as to allow a pilot to detect obstacles, for example during take-off.

For the reflector elements 31, there will advantageously be provided parabolic mirrors whose focus is adapted for using LEDs having an emitting area of 0.5 to 4 mm$^2$, which makes it possible to improve the luminous flux since such diodes generally have improved output. It will for example be possible to use diodes having a power of 1 to 10 W. It will be noted moreover that the reflector elements 31 are not necessary made of metal because, thanks to the presence of the annular support 24 which carries the radiator 35, these reflector elements 31 do not participate in the heat dissipation because they are not in contact with the outside air. In this respect it will be possible, for example, to use reflector elements 31 formed by mirrors made of injection molded plastic covered with a layer of reflective aluminum, which allows a saving in terms of weight.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A Light Emitting Diode (LED) light for an aircraft, comprising:
   a hollow cylindrical body attached to the aircraft's exterior;
   a plurality of LEDs, mounted in the hollow cylindrical body, to illuminate an area outside the aircraft; and
   at least one reflector to receive light beams emitted by the LEDs and configured to direct the light beams in a lighting direction of the LED light,
   wherein:
   the LEDs are (i) mounted on a cylindrical support and (ii) disposed on an external peripheral wall of the support radially in the hollow cylindrical body, the cylindrical support having a polygonal contour;
   at least one piece of equipment to execute an auxiliary function is mounted at a center of the support;
   the at least one piece of equipment is selected from the group consisting of a radar and a sensor; and
   the at least one piece of equipment and the LEDs are configured to function independently.

2. The LED light according to claim 1, wherein:
   the external peripheral wall of the support is composed of multiple sides, angled relative to one another, that together form the polygonal contour of the support; and
   each side of the cylindrical support having the polygonal contour comprises multiple LEDs of the plurality of LEDs.

3. The LED light according to claim 1, wherein the piece of equipment is covered by a glass that is transparent to light.

4. The LED light according to claim 3, wherein the glass comprises a de-icer.

5. The LED light according to claim 1, wherein the support includes a front face comprising a radiator for dissipating thermal energy, and the radiator is annular or disk shaped.

6. The LED light according to claim 1, wherein the diodes are mounted on at least one printed circuit board fixed on the support.

7. The LED light according to claim 1, further comprising an electronic power supply card for powering the diodes mounted to and housed by the support in the body, the electronic power supply card being configured to supply power to the plurality of LEDs and the piece of equipment.

8. The LED light according to claim 7, wherein the electronic power supply card is housed between the external peripheral wall of the support and an internal wall of the support.

9. The LED light according to claim 8, wherein the electronic power supply card is annular in shape.

10. The LED light according to claim 1, further comprising an annular glass sealably covering the diodes and the reflector.

11. The LED light according to claim 1, wherein the body includes a rear face comprising a radiator for dissipation of thermal energy.

12. The LED light according to claim 1, further comprising a set of juxtaposed reflector elements of revolution having a typically parabolic generatrix.

13. The LED light according to claim 12, wherein each diode is associated with a reflecting element.

14. The LED light according to claim 12, further comprising reflector elements inclinedly mounted with respect to the lighting direction of the LED light.

15. The LED light according to claim 14, wherein the reflector elements comprise injection molded plastic covered with a layer of light-reflecting aluminum.

* * * * *